United States Patent
Codrescu et al.

(10) Patent No.: US 7,689,806 B2
(45) Date of Patent: Mar. 30, 2010

(54) METHOD AND SYSTEM TO INDICATE AN EXCEPTION-TRIGGERING PAGE WITHIN A MICROPROCESSOR

(75) Inventors: Lucian Codrescu, Austin, TX (US); Erich Plondke, Austin, TX (US); Muhammad Ahmed, Dallas, TX (US); Vijaya Kumar Janjanam, San Diego, CA (US)

(73) Assignee: Q, San Diego, CA (US)

( * ) Notice: Subject to any disclaimer, the term of this patent is extended or adjusted under 35 U.S.C. 154(b) by 263 days.

(21) Appl. No.: 11/487,284

(22) Filed: Jul. 14, 2006

(65) Prior Publication Data

US 2008/0016316 A1    Jan. 17, 2008

(51) Int. Cl.
*G06F 12/00* (2006.01)
*G06F 9/00* (2006.01)

(52) U.S. Cl. .................. 711/207; 711/145; 711/154; 711/206; 712/225

(58) Field of Classification Search .......... 711/207, 711/145, 154, 206; 712/225
See application file for complete search history.

(56) References Cited

U.S. PATENT DOCUMENTS

| | | | |
|---|---|---|---|
| 5,493,660 A | | 2/1996 | Delano et al. |
| 6,778,181 B1 * | | 8/2004 | Kilgariff et al. ............. 345/582 |
| 6,850,243 B1 * | | 2/2005 | Kilgariff et al. ............. 345/582 |
| 6,919,904 B1 * | | 7/2005 | Kilgariff ..................... 345/582 |
| 2002/0156977 A1 * | | 10/2002 | Derrick et al. .............. 711/118 |
| 2003/0007156 A1 | | 1/2003 | Kissell |

FOREIGN PATENT DOCUMENTS

EP    0701212    3/1996
WO    03007156    1/2003

OTHER PUBLICATIONS

International Search Report-PCT/US07/073535, International Search Authority-European Patent Office-Nov. 26, 2007.
Written Opinion-PCT/US07/073535, International Search Authority-European Patent Office-Nov. 26, 2007.

* cited by examiner

*Primary Examiner*—Christian P Chace
*Assistant Examiner*—Mehdi Namazi
(74) *Attorney, Agent, or Firm*—Nicholas J Pauley; Peter M Kamarchik; Sam Talpalatsky (57) ABSTRACT

A method and system to indicate which page within a software-managed page table triggers an exception within a microprocessor, such as, for example, a digital signal processor, wherein a software-managed translation lookaside buffer (TLB) module receives a virtual address produced by an instruction within a Very Long Instruction Word (VLIW) packet, such as, for example, a fetch instruction, and further compares the virtual address to each stored TLB entry. If a match exists, then the TLB module outputs a corresponding mapped physical address for the instruction. Otherwise, if the VLIW packet spans two pages, where a first page is present as a TLB entry within the TLB module and the second page is missing from the stored TLB entries, an indication bit within a data field of a control register is set to identify the TLB miss exception to a software management unit. The software management unit retrieves the indication bit information from the register and further performs a page table look-up within the software-managed page table using the indication bit information in order to retrieve the missing page information. Subsequently, the missing page information is written into a new TLB entry within the TLB module for subsequent virtual address translation and execution of the packet of instructions.

36 Claims, 7 Drawing Sheets

METHOD AND SYSTEM TO INDICATE AN EXCEPTION-TRIGGERING PAGE WITHIN A MICROPROCESSOR

BACKGROUND

1. Field of the Invention

The invention relates generally to microprocessors and, more specifically, to a method and system to indicate an exception-triggering page within a microprocessor, such as, for example, a digital signal processor.

2. Background

Typically, computer systems include one or more microprocessor devices, each microprocessor device being configured to perform operations on values stored within a memory of the computer system and to manage the overall operation of the computer system. These computer systems may also include various multimedia devices, such as, for example, sound cards and/or video cards, each multimedia device further including one or more processors, such as, for example, digital signal processors (DSPs), which perform complex mathematical computations within each respective multimedia device.

A digital signal processor (DSP) typically includes hardware execution units specifically configured to perform such mathematical calculations, such as, for example, one or more arithmetic logic units (ALU), one or more multiply-and-accumulate units (MAC), and other functional units configured to perform operations specified by a set of instructions within the DSP. Such operations may include, for example, arithmetic operations, logical operations, and other data processing operations, each being defined by an associated set of instructions.

Generally, the execution units within the DSP read data and operands from a register file coupled to the memory and to the execution units, perform the instruction operations, and store the results into the register file.

SUMMARY

A method and system to indicate which page within a software-managed page table triggers an exception within a microprocessor, such as, for example, a digital signal processor, are described. In one embodiment, a software-managed translation lookaside buffer (TLB) module receives a virtual address produced by an instruction within a Very Long Instruction Word (VLIW) packet, such as, for example, a fetch instruction, and further compares the virtual address to each stored TLB entry. If a match exists, then the TLB module outputs a corresponding mapped physical address for the instruction.

Otherwise, if the VLIW packet spans two pages, where a first page is present as a TLB entry within the TLB module and the second page is missing from the stored TLB entries, an indication bit within a data field of a control register is set to identify the TLB miss exception to a software management unit. If the TLB miss exception was initiated from a page corresponding to the VLIW packet identified by a program counter within the system, then the indication bit is set to a zero value and the data field is set to 0x00. Alternatively, if the TLB miss exception was initiated from a page subsequent to the page corresponding to the VLIW packet, the indication bit is set to a one value and the data field is set to 0x01.

In one embodiment, the software management unit retrieves the indication bit information from the register and further performs a page table look-up within the software-managed page table using the indication bit information in order to retrieve the missing page information. Subsequently, the missing page information is written into a new TLB entry within the TLB module for subsequent virtual address translation and execution of the packet of instructions.

DETAILED DESCRIPTION

A method and system to indicate which page within a software-managed page table triggers an exception within a microprocessor, such as, for example, a digital signal processor (DSP), are described. Although the system is described in detail below in connection with a DSP, it is to be understood that the system may be implemented using a microprocessor device, or any other processing unit configured to receive an instruction to retrieve data from a memory module, to indicate the exception-triggering page within a software-managed page table, and to insert the information into a translation lookaside buffer (TLB) module within the microprocessor device for subsequent execution of the packet of instructions.

The software-managed TLB module receives a virtual address produced by an instruction within a Very Long Instruction Word (VLIW) packet, such as, for example, a fetch instruction, and further compares the virtual address to each stored TLB entry. If a match exists, then the TLB module outputs a corresponding mapped physical address for the instruction.

Otherwise, if the VLIW packet spans two pages, where a first page is present as a TLB entry within the TLB module and the second page is missing from the stored TLB entries, an indication bit within a data field of a control register is set to identify the TLB miss exception to the software management unit. If the TLB miss exception was initiated from a page corresponding to a VLIW packet identified by a program counter within the system, then the indication bit is set to a zero value and the data field is set to 0x00. Alternatively, if the TLB miss exception was initiated from a page subsequent to the page corresponding to the VLIW packet, the indication bit 460 is set to a one value and the data field is set to 0x01.

In one embodiment, the software management unit retrieves the indication bit information from the register and further performs a page table look-up within the software-managed page table using the indication bit information in order to retrieve the missing page information. Subsequently, the missing page information is written into a new TLB entry within the TLB module for subsequent virtual address translation and execution of the packet of instructions.

Figure 1:
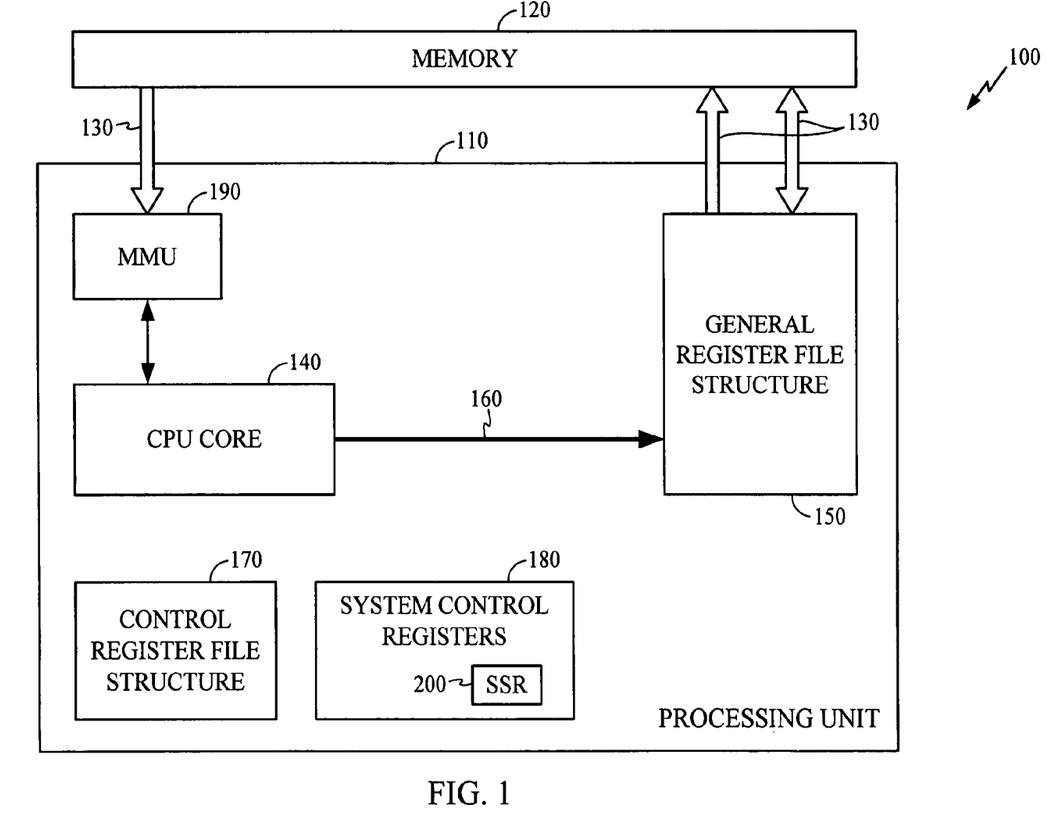
FIG. 1 is a block diagram of a digital signal processing system within which a set of instructions may be executed.

FIG. 1 is a block diagram of a digital signal processing system within which a set of instructions may be executed. As illustrated in FIG. 1, the digital signal processing system 100 includes a processing unit 110, a memory module 120, and one or more buses 130 coupling the processing unit 110 to the memory module 120.

The memory module 120 stores data and instructions, such as, for example, in the form of Very Long Instruction Word (VLIW) packets produced by a VLIW compiler, each VLIW packet comprising one or more instructions. Each instruction of a packet is typically of a predetermined width and has a particular address in the memory module 120, such that a first instruction in a packet typically has a lower memory address than a last instruction of the packet. Instructions stored within the memory module 120 are loaded into the processing unit 110 via buses 130, such as, for example, instruction load buses, data load buses, and/or data load/store buses. A memory management unit MMU 190 within the processing unit 110 is a hardware and/or software module configured to handle memory accesses requested by the unit 110 and is further coupled to a central processing unit core 140.

The central processing unit core 140 is further coupled to one or more general register file structures 150 via one or more pipelines 160. The processing unit 110 may further comprise one or more microprocessors, digital signal processors, or the like.

The general register file structure 150 further comprises a set of general register units, such as, for example, thirty two 32-bit wide register units, each register unit being accessible as a single register or as aligned pairs of two adjacent register units. The general register units are typically used for general computational purposes, such as, for example, address generation, scalar arithmetic, and vector arithmetic, and typically provide all operands for instructions, including addresses for load/store instructions, data operands for numeric instructions, and vector operands for vector instructions.

The processing unit 110 further includes a control register file structure 170 containing a set of control register units, which support special-purpose functionality, such as, for example, hardware loops, predicates, and/or other special operands, and multiple system control registers 180, which perform memory management activities, and which further include a system status register (SSR) unit 200, which will be described in further detail below in connection with FIG. 5.

Figure 2:
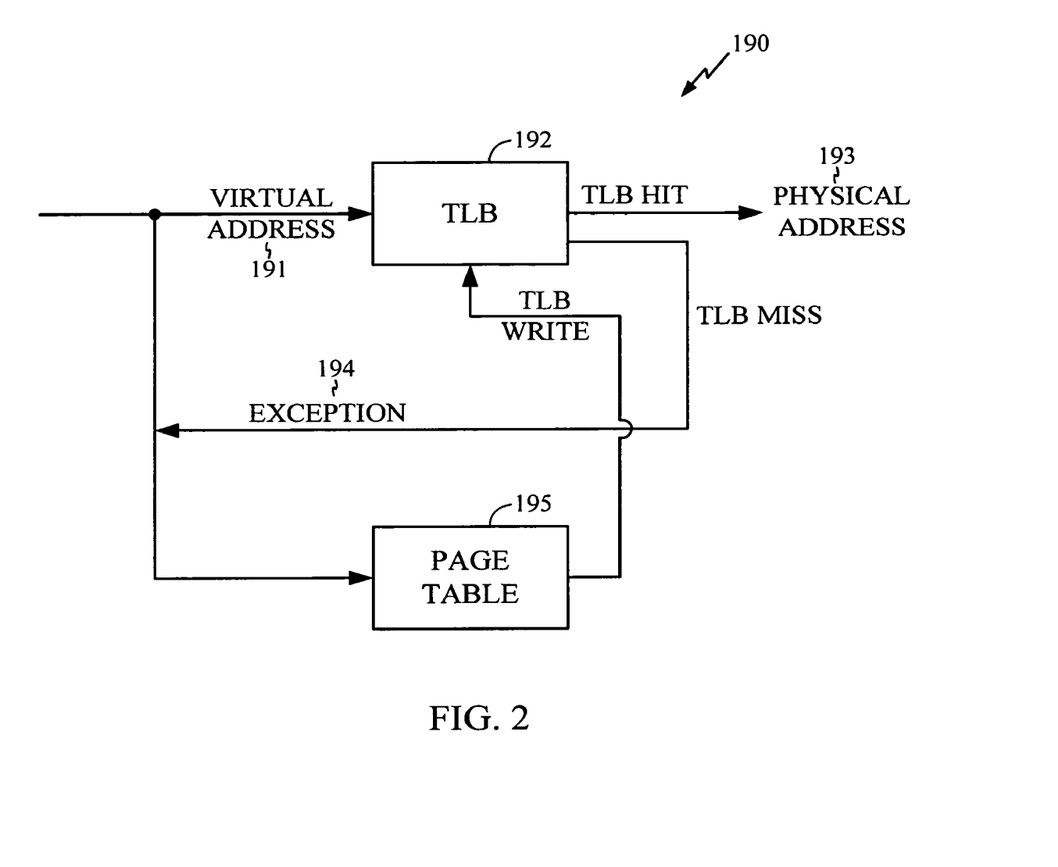
FIG. 2 is a block diagram illustrating one embodiment of a memory management unit within the digital signal processing system.

FIG. 2 is a block diagram illustrating one embodiment of a memory management unit within the digital signal processing system. As illustrated in FIG. 2, the memory management unit 190 further includes a translation lookaside buffer (TLB) module 192 coupled to one or more page tables 195.

Figure 3:
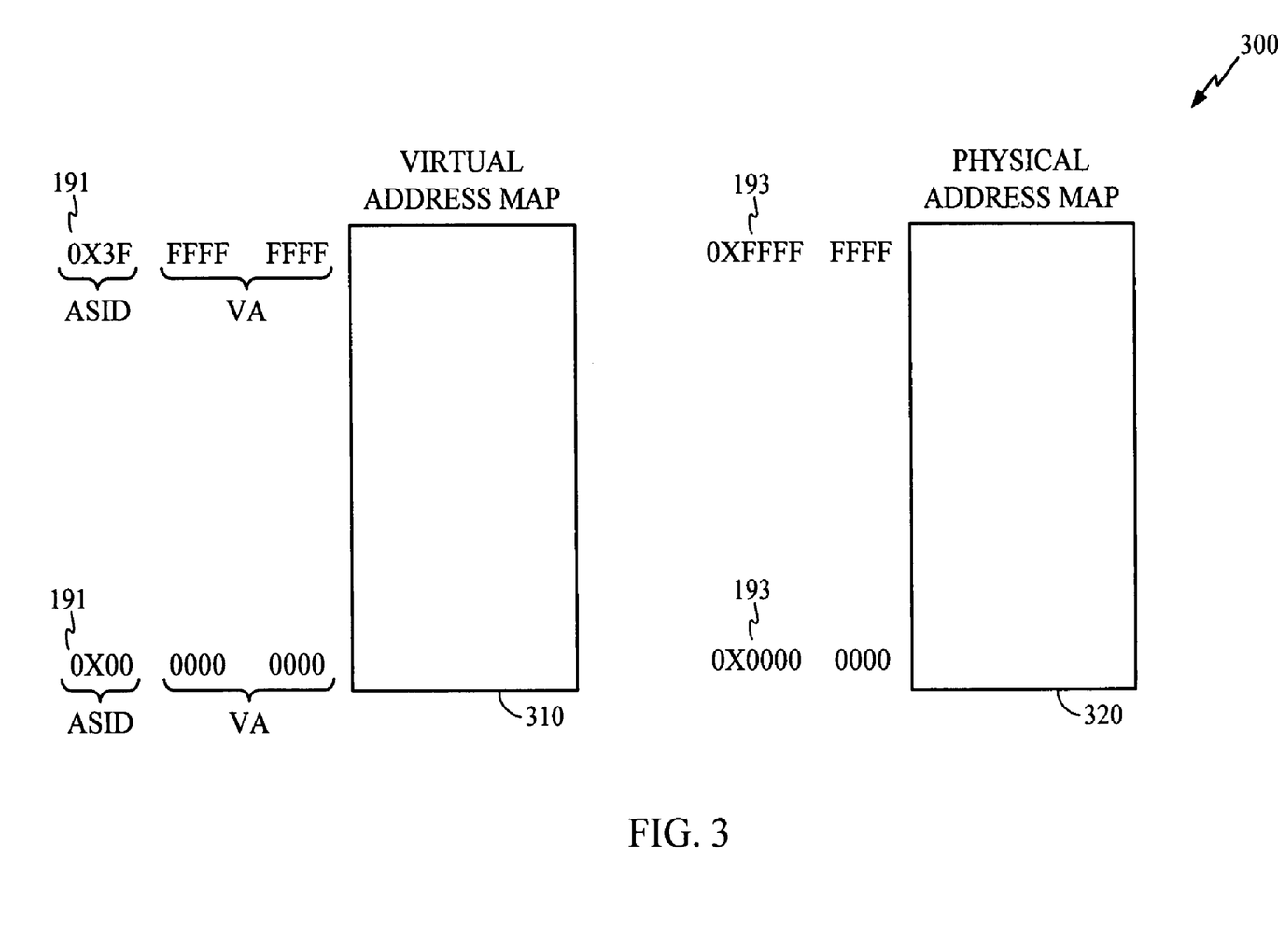
FIG. 3 is a block diagram illustrating one embodiment of a mapping of virtual and physical addresses stored in a software-managed page table within the digital signal processing system.

In one embodiment, the processing unit 110 implements a virtual memory system and the page tables 195 are data structures used by the virtual memory system to store a mapping between virtual addresses 191 generated by the program and physical addresses 193 contained within the main memory 120. FIG. 3 is a block diagram illustrating one embodiment of a mapping 300 of virtual and physical addresses stored in a page table 195 within the digital signal processing system. As illustrated in FIG. 3, a virtual address map 310 includes multiple virtual addresses 191, each virtual address 191 comprising an address space identifier (ASID), such as, for example, a private 6-bit identification tag, prepended to a virtual address (VA) body, such as, for example, a 32-bit address having a virtual page number (VPN) and a page offset, to form a 38-bit tag-appended virtual address. Each virtual address may be mapped into any physical address 193 stored within a physical address map 320 within the page table 195.

Referring back to FIG. 2, the TLB module 192 stores a cache of the address mapping 300 within multiple programmed TLB entries. The TLB module 192 receives a virtual address 191 produced by an instruction within a VLIW packet, such as, for example a fetch instruction, a load instruction, and/or a store instruction, and further compares in parallel the virtual address 191 to each programmed TLB entry. If a match exists, then the TLB module 192 outputs the corresponding mapped physical address 193. Otherwise, if no match exists, the TLB module 192 outputs a TLB miss exception 194 to the CPU core 140.

If the TLB module 192 is a hardware-managed buffer and the page table 195 is hardware-managed as well, the CPU core 140 accesses the page table 195 to retrieve an entry for the specified virtual memory address 191. If the CPU core 140 locates the entry and its associated data, then the entry is written into the TLB module 192 as a new TLB entry for further matching of the virtual address 191 to a physical address 193 within the TLB module 192.

If the TLB module 192 and the page table 195 are both software-managed entities, upon triggering the TLB miss exception, the software program must access the page table 195, identify the missing page information through an iterative search process, and perform the translation in software. However, if the software program does not know the location of the page information, the entire procedure may be time consuming and inefficient. Thus, a method is needed to enable the software program to identify the location of the missing page information within the software-managed page table.

Figure 4:
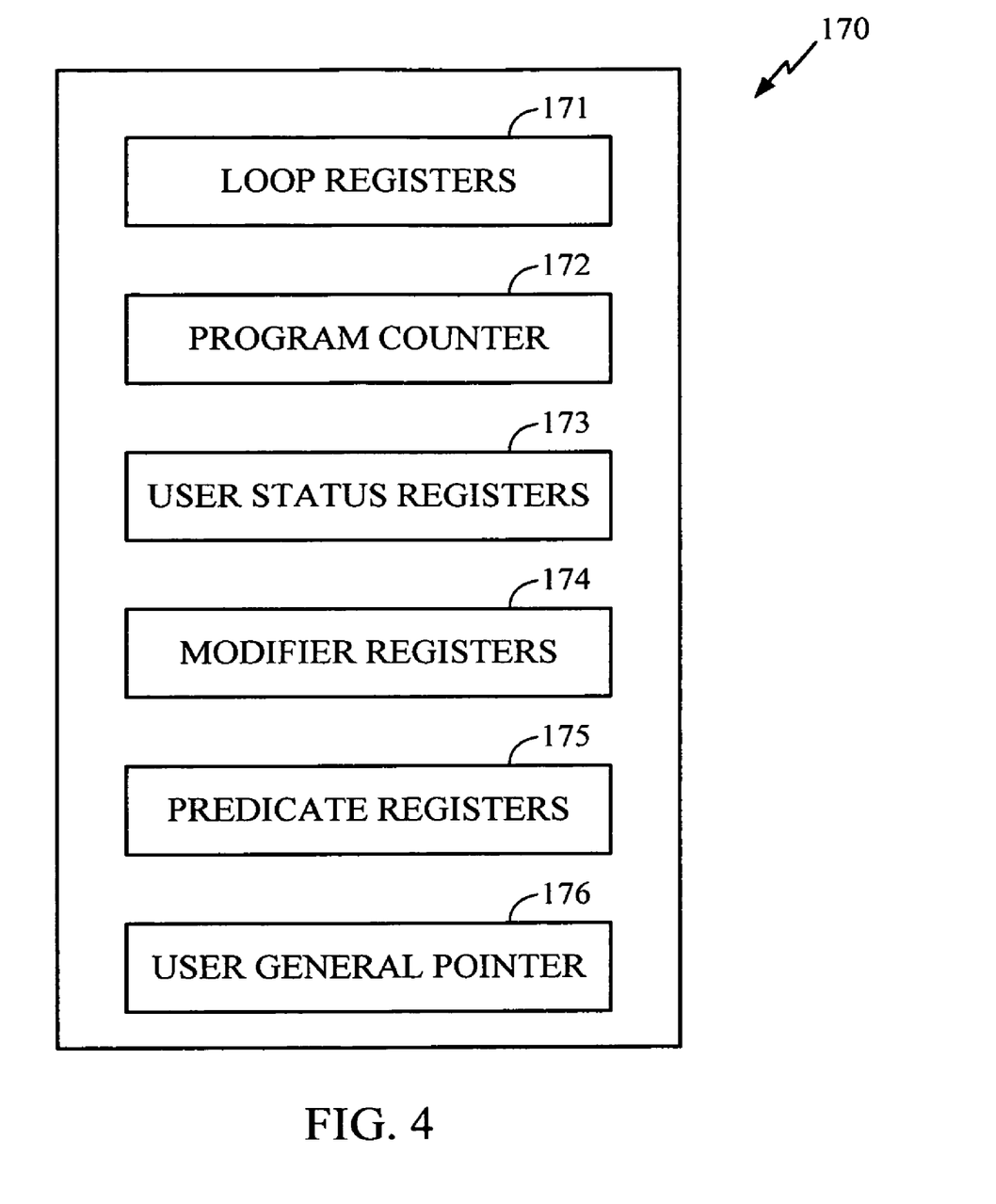
FIG. 4 is a block diagram illustrating one embodiment of a control register file structure within the digital signal processing system.

FIG. 4 is a block diagram illustrating one embodiment of a control register file structure within the digital signal processing system. The control register file structure 170 includes multiple control register units, such as, for example, loop registers 171, a program counter 172, user status registers 173, modifier registers 174, predicate registers 175, and a user general pointer 176, configured to provide access to special-purpose features, such as hardware loops, predicates, and/or other special operands. In one embodiment, the program counter (PC) 172 is a 32-bit register unit, which stores a data pointer to a next VLIW packet containing instructions to be executed within the system 100.

Figure 5:
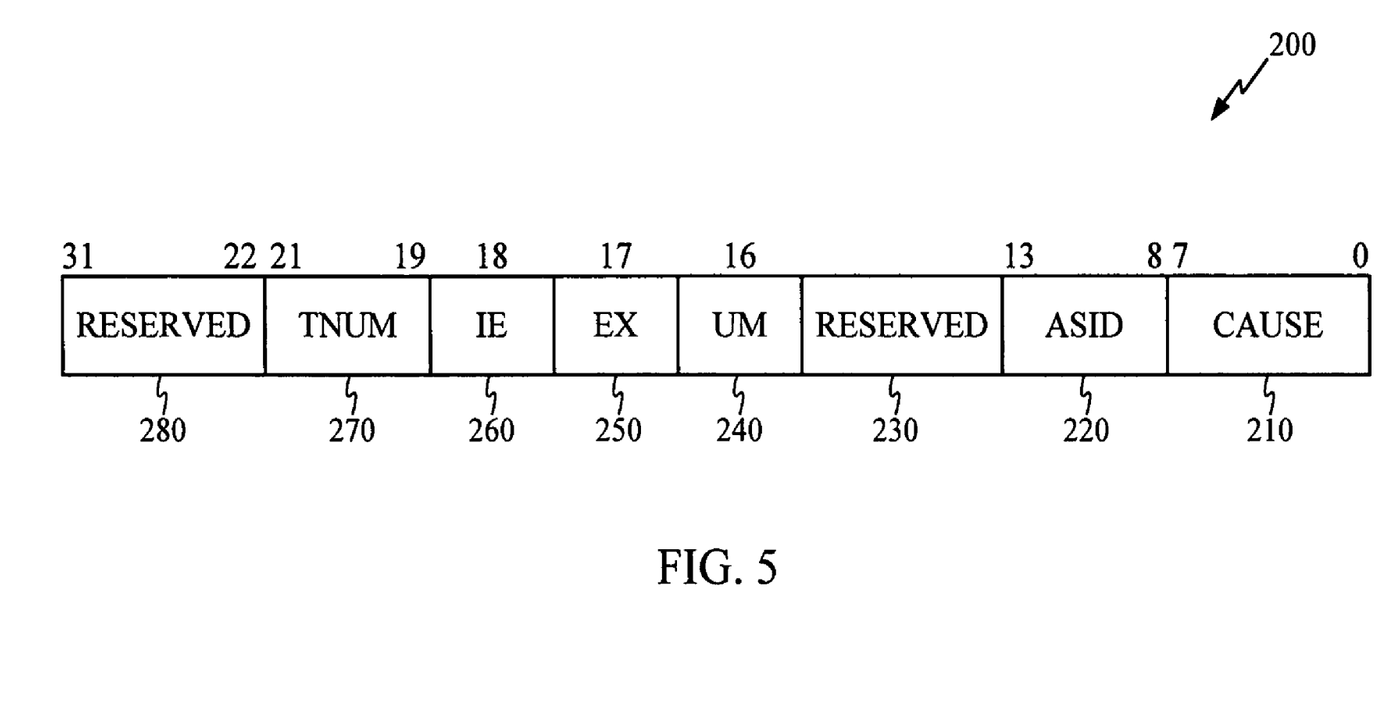
FIG. 5 is a block diagram illustrating one embodiment of a system status register within the digital signal processing system.

FIG. 5 is a block diagram illustrating one embodiment of a system status register within the digital signal processing system. As illustrated in FIG. 5, in one embodiment, the system or supervisory status register (SSR) 200 contains multiple data fields, such as, for example, a CAUSE data field 210, which may be an 8-bit read/only field that contains reasons for various exception conditions, as described in further detail below in connection with FIGS. 6 and 7. The SSR 200 may further include, for example, an ASID data field 220, which contains the 6-bit address space identifier (ASID) used as a tag extension in virtual addressing.

The SSR 200 may also include, for example, a User Mode (UM) data field 240, which contains a single read/write bit indicating a user mode (if the bit is set), or a supervisory mode (if the bit is clear), and an exception (EX) data field 250, which contains a single read/write bit indicating when an exception is accepted and is currently being processed, the single bit being set for current processing of the exception and being cleared upon completion of execution of the instruction.

The SSR 200 may further include, for example, an interrupt enable/disable (IE) data field 260, a thread number (TNUM) data field 270 and one or more reserved data fields 230 and 280, which are reserved for future processing and which return a zero value if read.

Figure 6:
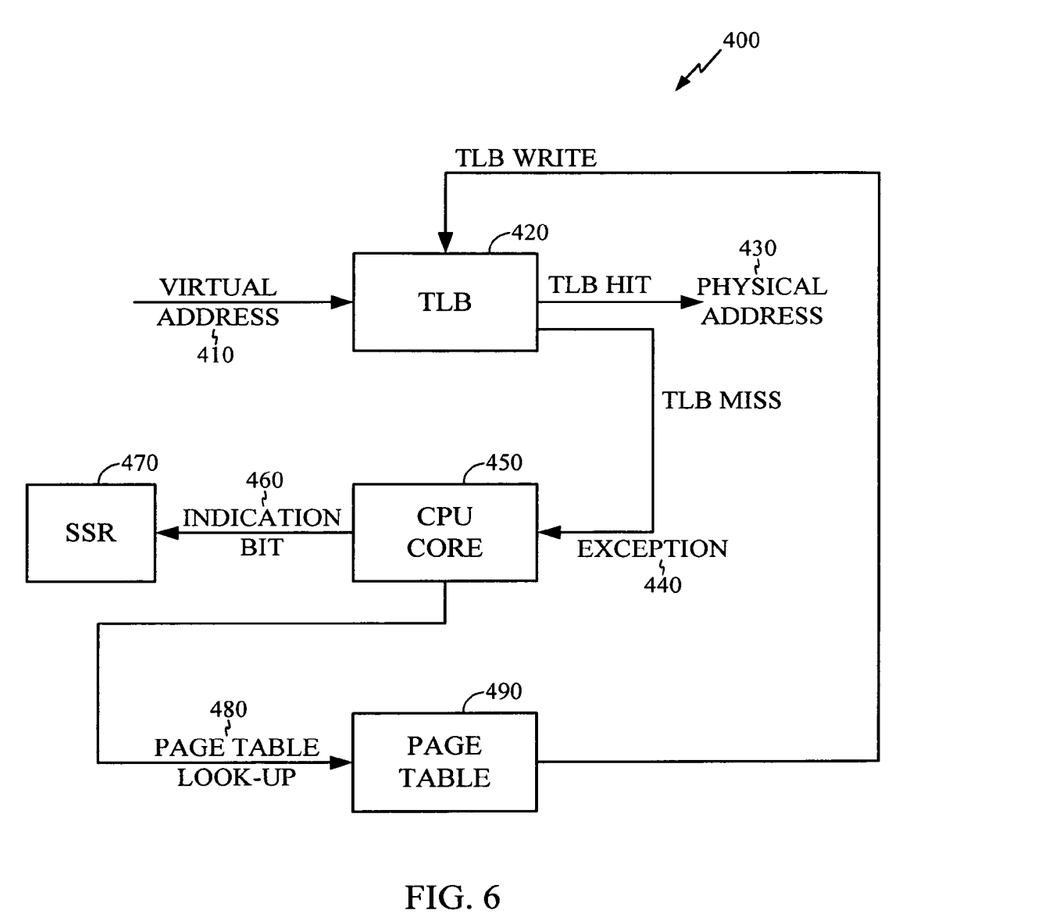
FIG. 6 is a block diagram illustrating one embodiment of a system to indicate which page within a software-managed page table triggers an exception within the digital signal processing system.

FIG. 6 is a block diagram illustrating one embodiment of a system to indicate which page within a software-managed page table triggers an exception within the digital signal processing system. As illustrated in FIG. 6, a software-managed TLB module 420 receives a virtual address 410 produced by an instruction within a VLIW packet, such as, for example, a fetch instruction, and further compares the virtual address 410 to each stored TLB entry. If a match exists, then the TLB module 420 outputs the corresponding mapped physical address 430. Otherwise, if no match exists, the TLB module 420 outputs a TLB miss exception 440 to the CPU core 450.

If the VLIW packet spans two pages, where a first page is stored as a TLB entry within the TLB module 420 and the second page is missing from the stored TLB entries, the CPU core 450 sets an indication bit 460 within a data field of a system status register (SSR) 470 to identify the TLB miss exception, such as, for example, the CAUSE data field 210 of the SSR 200 shown in FIG. 5, and further communicates the setting to the software management unit (not shown) running on the CPU core 450. In addition, the CPU core 450 sets an exception bit within a second data field, such as, for example, the EX data field 250 of the SSR 200, to indicate that the exception is accepted and is currently being processed.

If the TLB miss exception was initiated from the page corresponding to the packet identified by the data pointer within the program counter 172, then the CPU core 450 sets the indication bit 460 to a zero value and the CAUSE data field to 0×00. Alternatively, if the TLB miss exception was initiated from a page subsequent to the page corresponding to the packet identified by the data pointer within the program counter 172, the CPU core 450 sets the indication bit 460 to a one value and the CAUSE data field to 0×01.

In one embodiment, the software management unit retrieves the indication bit information from the CAUSE data field of the SSR 470 and further performs a page table look-up 480 within the software-managed page table 490 using the indication bit information in order to retrieve the missing page information. Subsequently, the missing page information is written into a new TLB entry within the TLB module 420.

In one embodiment, upon generation of a TLB miss exception 440, the actions performed may be illustrated in pseudocode as follows:

```
ELR = PC // save PC of the packet that was missing in TLB
SSR[EX] = 1 // set exception bit in SSR
SSR[CAUSE] = (miss due to PC page)? 0x00 : 0x01
PC = (EVB) | (4<<2)
```

Figure 7:
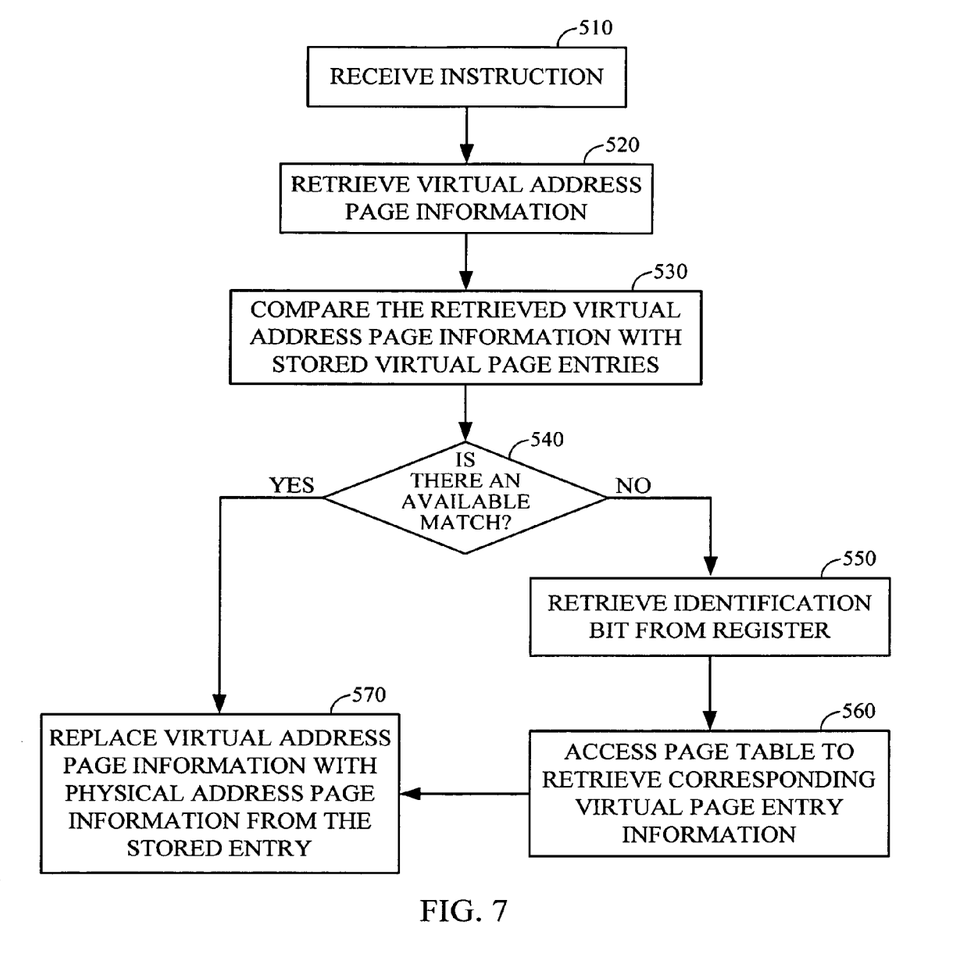
FIG. 7 is a flow diagram illustrating one embodiment of a method to indicate which page within a software-managed page table triggers an exception within the digital signal processing system.

FIG. 7 is a flow diagram illustrating one embodiment of a method to indicate which page within a software-managed page table triggers an exception within the digital signal processing system. As illustrated in FIG. 7, at processing block 510, an instruction is received. In one embodiment, the memory management unit 190 receives an instruction, such as, for example, a fetch instruction, and initiates a virtual address translation procedure.

At processing block 520, virtual address page information is retrieved. In one embodiment, the virtual address page information is retrieved from an instruction within a VLIW packet and is forwarded to the TLB module 420.

At processing block 530, the virtual address page information is compared to the stored virtual page entries. In one embodiment, the TLB module 420 compares the retrieved virtual address page information with virtual page entries stored within respective TLB entries to find a match.

At processing block 540, a decision is made whether there is an available match. In one embodiment, if the TLB module 420 finds a match within its stored TLB entries, then, at processing block 570, the virtual address page information is replaced with physical address page information from the matching stored TLB entry. In one embodiment, the TLB module 420 performs the virtual address translation and replaces the virtual address page information from the received instruction with physical address page information stored within the TLB entry.

In one embodiment, if the TLB module 420 does not find a match within its stored TLB entries, then, the TLB module 420 generates a TLB miss exception and prompts the CPU core 450 to set the indication bit 460 within the CAUSE data field of the SSR 470.

Then, at processing block 550, the identification bit information is retrieved from the register 470. In one embodiment, the software management unit retrieves the identification bit information from the CAUSE data field of the SSR 470.

At processing block 560, the page table is accessed to retrieve corresponding virtual page entry information. In one embodiment, the software management unit accesses the page table 490 and performs a page table look-up using the retrieved identification bit information to retrieve corresponding virtual page entry information, which is subsequently entered into a respective TLB entry within the TLB module 420.

Finally, the procedure jumps back to processing block 570, wherein the TLB module 420 performs the virtual address translation and replaces the virtual address page information from the received instruction with physical address page information stored within the new TLB entry.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in software executed by a processor, or in a combination of the two. It is to be understood that these embodiments may be used as or to support software programs, which are executed upon some form of processor or processing core (such as the CPU of a computer), or otherwise implemented or realized upon or within a machine or computer readable medium. A machine readable medium includes any mechanism for storing information in a form readable by a machine (e.g., a computer). For example, a machine readable medium includes RAM memory, flash memory, ROM memory, EPROM memory, LEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A method comprising:
   setting an indication bit to a predetermined value to identify an exception initiated by missing address information within a buffer module, said missing address information corresponding to a packet of executable instructions; and
   retrieving said address information from at least one page table using said indication bit to enable an address translation within said buffer module;
   wherein said packet spans at least two pages, the at least two pages including a first page stored within said buffer module and a second page containing said missing address information.

2. The method according to claim 1, wherein said setting further comprises:
   setting said indication bit to a zero value, if said exception is initiated from a stored page corresponding to said packet of executable instructions.

3. The method according to claim 1, wherein said setting further comprises:
   setting said indication bit to a one value, if said exception is initiated from a page subsequent to a stored page corresponding to said packet of executable instructions.

4. The method according to claim 1, wherein said indication bit is set within a data field of a register.

5. The method according to claim 1, wherein said buffer module and said at least one page table are software-managed entities.

6. The method according to claim 1, further comprising:
   receiving an executable instruction within said packet, said executable instruction containing a virtual address;
   comparing said virtual address to each stored entry within said buffer module to obtain matching address information; and
   initiating said exception if said matching address information is missing from said buffer module.

7. The method according to claim 6, wherein said executable instruction is a fetch instruction.

8. The method according to claim 4, further comprising:
   setting an exception bit within a second data field of said register to indicate that said exception is currently being processed.

9. The method according to claim 1, wherein said buffer module is a translation lookaside buffer (TLB) module.

10. An integrated circuit comprising:
    a memory management unit further comprising a buffer module coupled to at least one page table;
    a central processing unit coupled to said buffer module within said memory management unit; and
    a software management unit running on top of said central processing unit; said central processing unit to set an indication bit to a predetermined value to identify an exception initiated by missing address information within said buffer module, said missing address information corresponding to a packet of executable instructions and said software management unit to retrieve said address information from said at least one page table using said indication bit to enable an address translation within said buffer module;
    wherein said packet spans at least two pages, the at least two pages including a first page stored within said buffer module and a second page containing said missing address information.

11. The integrated circuit according to claim 10, wherein said central processing unit further sets said indication bit to a zero value, if said exception is initiated from a stored page corresponding to said packet of executable instructions.

12. The integrated circuit according to claim 10, wherein said central processing unit further sets said indication bit to a one value, if said exception is initiated from a page subsequent to a stored page corresponding to said packet of executable instructions.

13. The integrated circuit according to claim 10, wherein said indication bit is set within a data field of a register.

14. The integrated circuit according to claim 10, wherein said buffer module and said at least one page table are software-managed entities.

15. The integrated circuit according to claim 10, wherein said buffer module further receives an executable instruction within said packet, said executable instruction containing a virtual address, compares said virtual address to each stored entry within said buffer module to obtain matching address information, and initiates said exception if said matching address information is missing from said buffer module.

16. The integrated circuit according to claim 15, wherein said executable instruction is a fetch instruction.

17. The integrated circuit according to claim 10, wherein said central processing unit further sets an exception bit within a second data field of said register to indicate that said exception is being currently processed.

18. The integrated circuit according to claim 10, wherein said buffer module is a translation lookaside buffer (TLB) module.

19. A processor device comprising:
means for setting an indication bit to a predetermined value to identify an exception initiated by missing address information within a buffer module, said missing address information corresponding to a packet of executable instructions; and
means for retrieving said address information from at least one page table using said indication bit to enable an address translation within said buffer module;
wherein said packet spans at least two pages, the at least two pages including a first page stored within said buffer module and a second page containing said missing address information.

20. The processor device according to claim 19, further comprising:
means for setting said indication bit to a zero value, if said exception is initiated from a stored page corresponding to said packet of executable instructions.

21. The processor device according to claim 19, further comprising:
means for setting said indication bit to a one value, if said exception is initiated from a page subsequent to a stored page corresponding to said packet of executable instructions.

22. The processor device according to claim 19, wherein said indication bit is set within a data field of a register.

23. The processor device according to claim 19, wherein said buffer module and said at least one page table are software-managed entities.

24. The processor device according to claim 19, further comprising:
means for receiving an executable instruction within said packet, said executable instruction containing a virtual address;
means for comparing said virtual address to each stored entry within said buffer module to obtain matching address information; and
means for initiating said exception if said matching address information is missing from said buffer module.

25. The processor device according to claim 24, wherein said executable instruction is a fetch instruction.

26. The processor device according to claim 22, further comprising: means for setting an exception bit within a second data field of said register to indicate that said exception is currently being processed.

27. The processor device according to claim 19, wherein said buffer module is a translation lookaside buffer (TLB) module.

28. A computer readable medium containing executable instructions, which, when executed in a processing system, cause said system to perform a method comprising:
setting an indication bit to a predetermined value to identify an exception initiated by missing address information within a buffer module, said missing address information corresponding to a packet of executable instructions; and
retrieving said address information from at least one page table using said indication bit to enable an address translation within said buffer module;
wherein said packet spans at least two pages, the at least two pages including a first page stored within said buffer module and a second page containing said missing address information.

29. The computer readable medium according to claim 28, wherein said setting further comprises:
setting said indication bit to a zero value, if said exception is initiated from a stored page corresponding to said packet of executable instructions.

30. The computer readable medium according to claim 28, wherein said setting further comprises:
setting said indication bit to a one value, if said exception is initiated from a page subsequent to a stored page corresponding to said packet of executable instructions.

31. The computer readable medium according to claim 28, wherein said indication bit is set within a data field of a register.

32. The computer readable medium according to claim 28, wherein said buffer module and said at least one page table are software-managed entities.

33. The computer readable medium according to claim 28, wherein said method further comprises:
receiving an executable instruction within said packet, said executable instruction containing a virtual address;
comparing said virtual address to each stored entry within said buffer module to obtain matching address information; and
initiating said exception if said matching address information is missing from said buffer module.

34. The computer readable medium according to claim 33, wherein said executable instruction is a fetch instruction.

35. The computer readable medium according to claim 31, wherein said method further comprises:
setting an exception bit within a second data field of said register to indicate that said exception is currently being processed.

36. The computer readable medium according to claim 28, wherein said buffer module is a translation lookaside buffer (TLB) module.

* * * * *